United States Patent [19]

Stoy et al.

[11] 3,779,792

[45] Dec. 18, 1973

[54] METHOD OF PROTECTING GLASS AGAINST FOGGING

[75] Inventors: Artur Stoy; Renata Urbanová, both of Prague, Czechoslovakia

[73] Assignee: Ceskoslovenska akademie ved, Praha, Czechoslovakia

[22] Filed: Mar. 8, 1971

[21] Appl. No.: 122,225

[30] Foreign Application Priority Data

Mar. 13, 1970 Czechoslovakia .................. 1672-70

[52] U.S. Cl. .................. 117/72, 106/13, 117/124 D, 117/124 E, 117/161 UN, 252/70

[51] Int. Cl. .......................... C09k 3/18, B32b 17/10

[58] Field of Search .................. 106/13; 117/124 D, 117/124 E, 72, 161 UN; 252/70

[56] References Cited
UNITED STATES PATENTS

| | | | |
|---|---|---|---|
| 3,640,838 | 2/1972 | Chow et al. | 117/124 E X |
| 3,647,507 | 3/1972 | Ashcraft | 117/161 UN X |
| 3,678,098 | 7/1972 | Lewis et al. | 117/124 E X |
| 2,968,643 | 1/1961 | Bailey | 106/13 X |
| 3,515,579 | 6/1970 | Shepherd et al. | 106/13 X |
| 3,625,741 | 12/1971 | Stoy et al. | 117/72 |
| 3,285,802 | 11/1966 | Smith et al. | 117/124 D X |
| 3,068,214 | 12/1962 | Rassweiler et al. | 117/124 E X |

FOREIGN PATENTS OR APPLICATIONS 18,972    6/1970    Japan ............................... 117/124 E

*Primary Examiner*—Ralph Husack
*Attorney*—Richard Low and Murray Schaffer

[57] ABSTRACT

A method of protecting glass from becoming fogged by water or ice from condensed water vapour of the ambient atmosphere. The glass has applied thereto at least on one surface at least one coating comprising a hydrophilic polymeric salt having one ion covalently bonded and the other free. This coating is conveniently applied upon an intermediate base comprising a hydrophobic polymer which has good adhering properties with the glass surface.

6 Claims, No Drawings

METHOD OF PROTECTING GLASS AGAINST FOGGING

BACKGROUND OF THE INVENTION

Field of the Invention

The invention relates to a method of protecting inorganic or organic glass from becoming fogged by water or ice from condensed water vapour of the ambient atmosphere.

Various coatings are known for application to glass to protect the glass of windows, eyeglasses, goggles, and the like from becoming fogged from the above mentioned source. Such coatings have to be hydrophilic and should possess a capacity of reducing water surface tension. Glycerol soaps or other suitable wetting agent provides only temporary and imperfect protection against fogging. Such soaps and other known protective agents are, moreover, easily washed off by water. Furthermore, they provide only minimal protection against fogging at low temperatures when water freezes and this results in opacity of the glass by light scattering on small ice crystals. It is, therefore, highly desirable to find a permanent coating which substantially permanently protects glass from becoming fogged.

Such coatings have to meet various requirements. In addition to the obvious requirement of transparence and optical isotropy, they should also be resistant to water and scratching or scoring and to spalling or scaling even under wet conditions. Protection against fogging should be permanent even at low temperatures. It should also be possible, if required, to readily remove such a coating and to replace it with a new one.

Description of the Prior Art

Existing protective coatins which prevent fogging or a decrease of visibility by the formation of separate water drops, caused either by condensation from air or from rain water, are not quite satisfactory in all respects. For example, though transparent coatings from hydrophilic, nonionic polymers, such as polyacrylamide, polymeric glycol methacrylate and the like are satisfactory under conditions of moderate cold, they become saturated with water after a certain time and then swell. If the temperature drops below the freezing point, the coating becomes dim due to the formation of ice crystals. This dimming lasts rather a long time, even after warming. The dimming cannot, of course, be wiped off or removed since the ice crystals are inside the polymeric coating. Wet coatings of this type are also only slightly resistant to scratching, even if a cross-linked polymer is used.

SUMMARY OF THE INVENTION

It is, therefore, a primary object of this invention to eliminate the above mentioned drawbacks which are characteristic of the known coatings.

Another object is to provide an improved method of protecting inorganic or organic glass against dimming or fogging, particularly under low temperature conditions.

A more specific object of the invention is to provide a method characterized by the fact that glass is provided on one side or on both sides with at least one coating comprising a hydrophilic polymeric salt having one ion covalently bonded to the polymeric chain while the other ion is free. The polymeric salts are conveniently selected so that they substantially reduce the freezing point of water. Consequently, even after saturation of the polymeric layer with water and even in the presence of a large difference between the outdoor and indoor temperatures no visible ice crystals inside the coating or on its surface are produced.

The polymeric salts are conveniently selected so that they are insoluble in water. Solubility is prevented either by copolymerization of a hydrophilic salt producing monomer with a monomer forming a hydrophobic polymer, or by cross-linking. The two methods may be combined, for example, in that the salt producing polymer which is soluble in water becomes mixed with a hydrophobic polymer with which it becomes subsequently combined by means of covalent or fixed ion bonds which are not loosened by water. Thus, a special type of three-dimensional polymer is produced.

The ions which are firmly connected with the polymer may be either positive or negative. Their counterions are then such that they form hydrating salts which dissociate well in water. If there are covalently bonded anions, such as $-SO_3^-$, $-O.SO_3^-$, $-O.PO_3^{2-}$, $-COO^-$,

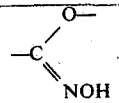

in the copolymer chain, the counterions are selected from cations of alkaline metals such as $Na^+$, $K^+$, $Li^+$, $Rb^+$, $Cs^+$, or quaternary ammonium cations, for example $NH_4^+$, $NR_3H^+$, or quaternary ammonium salts derived from diamines or polyamines which cause ion cross-linking. If, on the contrary, there are firmly bonded on the polymeric skeleton cations, more particularly of the quaternary ammonium type, the most suitable type of counterions are anions of monobasic or polybasic inorganic acids, for example, $I^-$, $Br^-$, $Cl^-$, $F^-$, $-SO_4^{--}$, $-PO_4^{--}$, $P_2O_7^{--}$, or also of organic acids, such as ethane sulfonic, methane sulfonic, ethylene disulfonic, formic, acetic acids, and the like.

Cross-linking can be accomplished either in a concentrated monomeric layer poured over the glass surface which is to be protected against fogging or dimming, or in a linear copolymer or a mixture of polymers or copolymers that are additionally cross-linked.

Polymerization on a glass surface is not very advantageous because it must be accomplished, as a rule, under an inert atmosphere. The monomeric mixture must be concentrated by means of a suitable polymer to give it thixotropic properties and to make it adhere to the glass surface which does not generally have a strictly horizontal position, until gelatinization takes place.

Additional cross-linking by covalent bonds may be accomplished by means of various reactions, such as for example by two methods. One suitable method which can be used employs copolymers or mixtures of copolymers whose side groups which are of different types are able to enter into a reaction which connects the chains by additional cross-linkage. An example is a mixture of a copolymer of glycidyl methacrylate and methacrylic acid with copolymers comprising hydroxyl or amine side groups, for example partially saponified polyvinyl acetate. By additional heating of the mixture reaction of the epoxy group of one copolymer with the hydroxyl group of a second copolymer occurs with creation of cross-linkages.

The essential feature of the second method of additional cross-linkage is the addition of a polyfunctional, usually low molecular weight, material which can react with some of the side groups of both types of macromolecules in the mixture. An example is the reaction of the copolymer of glycidyl methacrylate and methacrylic acid with ethylene diamine or with another polyamine, or reactions of amide groups with formaldehyde or its derivatives, for example with dimethylolurea. Another example is the reaction of hydroxyl side groups with polyisocyanates and the like.

Fixed ion cross-linking occurs also by action of polyvalent ions, for example $Cr^{3+}$ or $Al^{3-}$ on copolymers comprising acidic side groups (anions), for example carboxyls or sulfogroups. A condition for of permanent cross-linking is that the polyvalent cations form insoluble salts which do not dissociate in water with the polymeric anions. Such ionic cross-linking causes to a certain extent a reduction in the hydrophilic and swelling capacity of the copolymer which condition may be desirable in certain cases. Ion cross-linking with chromic salts gives the copolymer a light greenish-blue or bluish-violet color which is often a welcome aesthetic effect. Cross-linking with ferric cations gives the polymer a light yellowish color, while layers cross-linked with aluminium ions are colorless.

It is also possible to use polymers and copolymers or mixtures of polymers and copolymers comprising both acidic and basic side groups. In order to avoid excessive ion cross-linking produced by bonds between groups of opposite charge, at the cost of the hydrophilic capacity, it is advantageous if groups of one type are in excess.

A high degree of cross-linking increases hardness, resistance against abrasion and against water and aqueous solutions and also chemical resistance in general. However, the sorptive capacity for condensed water and hydrophilic properties are reduced. It is therefore necessary to choose a suitable compromise. Generally, the rule is that the degree of cross-linking should not be extremely high. A medium or lower degree of cross-linking is suitable, generally corresponding to 1 to 10 percent of the consumed cross-linking agent, but it depends also on the type of polymer and on the application.

It is also possible to use a single layer which comprises enough hydrophilic salt producing groups in addition to hydrophobic groups, thereby securing physical resistance and adhesion to glass. An example is a copolymer of acrylonitrile or methacrylonitrile with methacrylic acid or acrylic acid which, after completed copolymerization is transformed into polymeric ammonium or quaternary ammonium salts or salts of alkaline metals, or a copolymer of acrylonitrile or acrylate with sodium ethylene sulfonate.

Sometimes it is convenient to use two layers of which the lower one adheres well to glass and is hydrophobic, while the upper layer adheres well to the lower one and is hydrophilic. The lower layer which adheres well to glass is suitably made from poly(glycidyl methacrylate), while the upper hydrophilic layer may be made, for example, from a copolymer of acrylonitrile with methacrylic acid . Two layers are convenient because adhesion to glass and hydrophilic capacity which is necessarily connected with a certain degree of swelling are contrary requirements which must always be solved by compromise if only one layer is used. However, if two layers are used both requirements may be well met in the individual layers, assuming of course good adhesion between the two layers. This assumption may be met rather easily.

DESCRIPTION OF EXAMPLES OF CARRYING OUT THE INVENTION

Various modifications of the process in accordance with the invention are given in the following examples which, however, may be further modified and extended by using average knowledge and skill of a chemist in the field of macromolecular chemistry and technology.

EXAMPLE I

In a closed vessel having a volume of 1 litre and equipped with an anchor stirrer rotating at 100 revolutions per minute there are dissolved 5 percent by weight of acrylonitrile in a solution of zinc chloride $d = 1.90$ acidulated with concentrated hydrochloric acid to a pH of 1.7 . As a polymerization initiator 0.2 weight percent, based on the weight of each monomer of potassium pyrosulphite and 0.3 percent by weight of ammonium peroxosulphate are added in the form of 10 percent aqueous solutions. After conversion of approximately 50 percent which becomes manifest by a considerable increase of the viscosity of the solution, there are added gradually within 30 minutes an additional further 5 percent by weight of acrylonitrile, and stirring is continued until completion of polymerization, that is, until achievement of at least 90 percent conversion. In the meantime, the temperature increased spontaneously in a range between 35° and 45° C. By switching on the external heating, the temperature of the stirred solution is gradually increased to 120° C (measured in the solution), and it is kept at this temperature for 10 hours. The copolymer is let out in a thin stream, while stirring, into excessive cold 1 percent hydrochloric acid. After elimination of the major part of zinc ions, it is first washed in pure water which is added gradually while stirring and, only in an amount that insures the reaction remains below a pH of 7, and conveniently between a value of 5.5 and 6.5 . The copolymer which in addition to acrylonitrile units, comprises also units of acrylamide and acrylic acid, is partly dissolved, and the remainder strongly swells. The remainder of the copolymer is also dissolved by adding 10 to 15 percent by weight of dimethyl formamide. The viscous solution is filtered in a warm state through fritted glass.

On the glass which is to be protected against fogging or dimming, there is first applied a thin layer of poly(-glycidyl methacrylate) dissolved in a 5 percent solution of dimethyl formamide. After drying, which may be accelerated, for example by heating with a source of infrared radiation, the above mentioned solution of the copolymer is applied and dried. When almost dry, the layer is hardened by exposure under heat to gaseous formaldehyde in a closed space.

The protective coating is useful for protecting the glass of skiing goggles or eyeglasses against fogging or dimming up to external temperatures of $-15°$ C for an unlimited time if measures are taken to achieve effective aeration.

EXAMPLE II

In the example of Example I, pure glass is first covered with a thin layer of a copolymer of acrylonitrile and sodium ethylene sulfonate (molecular ratio 6:1) from a solution in dimethyl formamide and water (weight ratio 9:1) and after drying there is applied a solution of a copolymer of acrylonitrile with sodium ethylene sulfonate (molecular ratio 2:1) in dimethyl formamide and water (weight ratio 3:1).

EXAMPLE III

In the example Example I there is employed linear polystyrene of an average molecular weight of about 30.000 is transformed by chloromethylation, amination and quaternization into a polymer of which the majority of phenyl nuclei is substituted by a quaternary ammonium group.

On the cleaned glass there is first applied a copolymer of acrylonitrile with sodium ethylene sulfonate (molecular ratio 3:1) from a solution of dimethyl formamide-water (weight ratio 4:1). After drying, the layer is dipped for 10 minutes into a 5 percent hydrochloric acid, and washed in distilled water. After partial drying, there is applied a layer of the above mentioned derivative of polystyrene in the form of a viscous aqueous solution of the respective halogenide. During drying, which should not be too vigorous, there is released hydrogen halogenide (hydrogen iodide in the case of an iodide of the quaternary base) by reaction of a sulfogroup with the base halogenide.

EXAMPLE IV

A copolymer of methacrylonitrile with methacrylic acid was prepared by precipitating the copolymer in a 30 percent aqueous dimethyl formamide solution by means of a redox initiator comprising 0.2 percent sodium thiosulphate, 0.4 percent potassium persulphate, and 0.0001 % cuprous chloride (dihydrate), by weight, based on the weight of the two monomers. The copolymer, comprising the two monomeric units in a molar ratio 3:1, was applied to glass from a solution of a mixture of dimethyl sulphoxide, ethanol and acetone (3:1:1). The wet layer was neutralized with ammonia gas and dried.

EXAMPLE V

Ten parts by weight of acrylonitrile are dissolved in 90 parts by weight of colorless nitric acid ($d = 1.65$), the solution is degassed and there are added 0.03 parts of potassium persulphate and 0.05 part of dimethyl aminoethylacetate. The solution was held at a temperature of 25° C under an inert gas. Polymerization was then completed after 2 days. The solution was heated for 12 hours at a temperature of 45° C and the poured in a thin stream into water heated to 70° C. The precipitated copolymer so made was thoroughly washed in cold water until elimination of acid was complete and then dissolved in a 0.2 percent aqueous solution of potassium hydroxide until complete neutralization (pH 6) was achieved and then 10 volume percent of dimethyl formamide were added. Before application there was added 1 percent of dimethylolurea. The solution is applied on the lower layer of poly(glycidyl methacrylate) prepared by polymerization of glycidyl methacrylate (eight parts) in dimethyl formamide (92 parts). The solution obtained by polymerization is directly used to form a basic layer. After application of both layers, drying is carried out and the coating is heated by an infrared radiator for 20 minutes to a temperature of 120° C.

EXAMPLE VI 17 ml of acrylonitrile, 10 ml of methacrylic acid and 3 ml of vinyl acetate were dissolved under an inert gas in 250 ml of deaerated distilled water. As an initiator there were added 1 ml of a 10 percent aqueous solution of sodium pyrosulfite, 1 ml of 10 percent aqueous solution of ammonium persulfate, and 2 drops of a 0.1 percent solution of cupric sulfate (pentahydrate). The mixture was left under an inert atmosphere, with occasional stirring, at room temperature. The following day the separated copolymer was filtered out and washed in warm water. After partial drying, it was dissolved in a 0.2 percent sodium hydroxide while incompletely neutralized, and 10 volume percent of dimethylformamide was added. The filtered solution was applied to glass which had been previously provided with a thin layer of polyglycidyl methacrylate, as in EXAMPLE V. The dried layer was not hygroscopic, but protected the glass permanently against fogging and dimming at external temperatures down to −10° C.

EXAMPLE VII

The process described in EXAMPLE VI was repeated except that 0.1 g of chromic acetate was added into the copolymer solution. The dried coating has a light bluish-green coloration and increased resistance against water and scratching.

We claim:

1. A method of protecting glass surfaces from becoming fogged by water or ice from condensed water vapor from ambient atmosphere comprising applying to at least one surface of said glass a water insoluble ionic coating comprising a hydrophilic polymeric salt selected from alkaline, ammonium or quaternary ammonium salts of acrylonitrile or methacrylonitrile copolymerized with a member selected from the group consisting of acrylic acid, methacrylic acid and ethylene sulfonic acid, one ion of said polymeric salt being covalently bonded to the polymeric chain, the other ion thereof being free.

2. A method as claimed in claim 1, wherein the coating comprising the hydrophilic polymeric salt is additionally cross-linked after application on the glass.

3. A method of protecting glass surfaces from becoming fogged by water or ice from condensed water vapor from ambient atmosphere comprising applying onto at least one surface of said glass a hydrophobic polymeric coating base layer and thereafter applying onto said base layer a water insoluble ionic coating comprising a hydrophilic polymeric salt selected from alkaline, ammonium or quaternary ammonium salts of acrylonitrile or methacrylonitrile copolymerized with a member selected from the group consisting of acrylic acid, methacrylic acid and ethylene sulfonic acid, one ion of said hydrophilic polymeric salt being covalently bonded to the polymeric chain, the other ion thereof being free.

4. A method as defined in claim 3 which comprises applying said hydrophobic polymer for forming said base layer onto said glass surface in the form of an aqueous solution thereof in a dialkyl formamide as solvent, permitting said solution to dry, applying said hydrophilic salt onto said base layer thereby formed in the form of its solution in a different solvent and permitting said hydrophilic salt solution to dry.

5. A method as defined in claim 3 wherein said hydrophobic polymer is poly(glycidyl methacrylate).

6. A method as claimed in claim 3, wherein the coating comprising the hydrophilic polymeric salt is additionally cross-linked after application on the glass.

* * * * *